Aug. 28, 1962  J. L. FELDER  3,050,812
METHOD OF PRODUCING VITREOUS CLAY PRODUCTS
Filed June 6, 1960
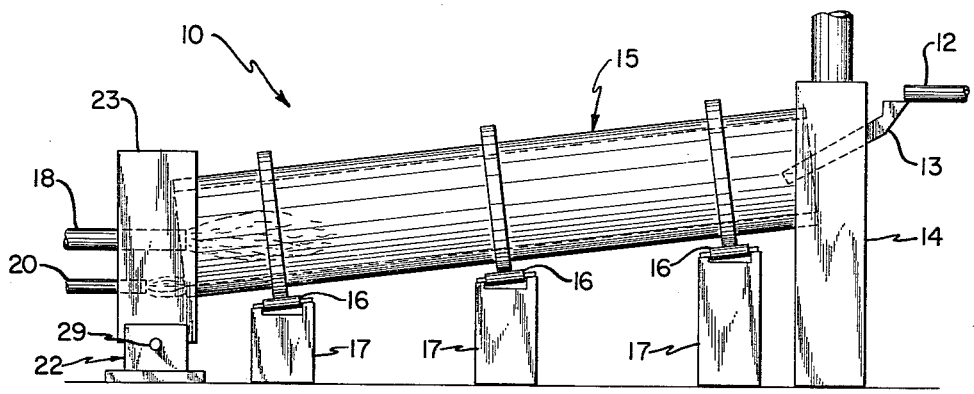
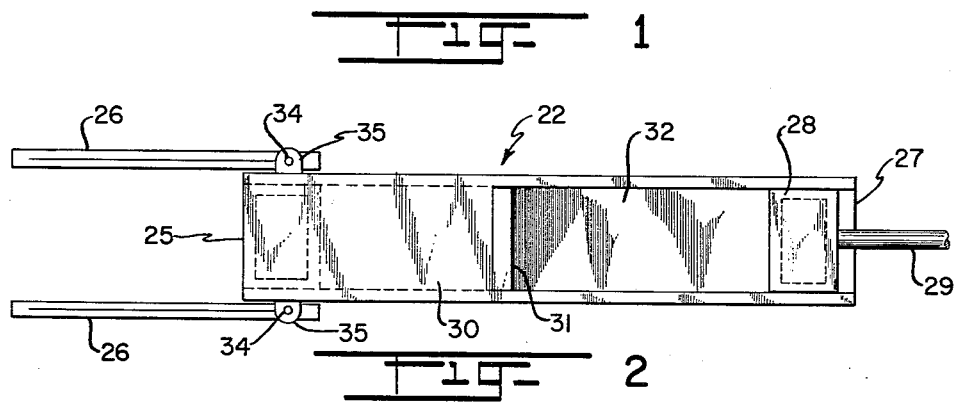
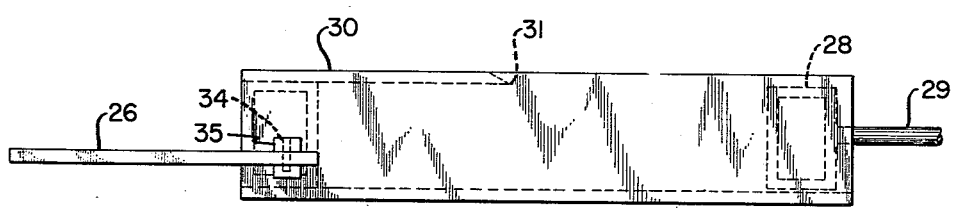
INVENTOR.
JOHN LAWSON FELDER
BY
ATTORNEY

United States Patent Office 3,050,812
Patented Aug. 28, 1962

3,050,812
METHOD OF PRODUCING VITREOUS CLAY
PRODUCTS
John Lawson Felder, P.O. Box 8005, San Antonio, Tex.
Filed June 6, 1960, Ser. No. 34,159
12 Claims. (Cl. 25—156)

This invention relates to a process for the manufacture of clay products, and relates more particularly to novel and improved process for the production of molded vitreous clay products specifically involving a novel succession of heating and confined molding steps. This application is a continuation-in-part of my earlier co-pending U.S. patent application, Serial No. 685,383 filed September 23, 1957, now abandoned.

It is customary in clay molding processes to form either partially or completely vitrified products from a succession of steps including those of preparing the raw clay or argillaceous materials to produce particles of relatively uniform size, feeding the particles into a kiln or similar piece of equipment at a controlled rate and heating to a temperature at which at least a portion thereof fuses, and then to mold or otherwise form the material to produce the final shape following which the resultant material may either be annealed or heat-treated to arrive at the finished product. It is important to note that most of the prior art processes fire or heat the clay to a temperature which causes at least a part of the clay to fuse or become sticky to prepare it for subsequent molding into the final shape. Generally in all such processes the molding step has little or nothing to do with conversion of the raw material from solid particles into a fused state, this being dependent upon the proportion of material fused through heating alone.

A number of problems are associated with production of either partially or completely vitrified clay products through customary processes known to the art, especially that of handling the sticky or fused mass of clay upon heating and of controlling the density and uniformity of the product. Some of these problems, such as control over the density and uniformity, are overcome by heating the material to a temperature such that it is converted into a completely liquefied or fused state so as to result in a finished product of uniform density. However, this is offset by other problems, notably the stickiness and consequent difficulty of handling the molten clay prior to molding and of the cost of carrying out the firing operation at the higher temperatures. Associated with this is the time factor involved in heating and preparing the materials to a state at which the material is of uniform density and quality prior to the molding operation.

Accordingly, it is a primary object of the present invention to provide an improved process for producing vitreous clay products which substantially eliminates any problems of sticking of the material to the kiln mold and other processing equipment, and further eliminates a number of special control measures normally required in the formation of the products.

Another object of the present invention is to make provision for a low temperature rapid process in forming vitreous clay products of superior quality from raw unconditioned clay or argillaceous materials, and more specifically to provide a unique molding process for such clays which achieves the results of high temperature processes at temperatures several hundred degrees below that normally required and wherein the resultant product is of uniform density, high structural strength, and of a plastic or glass-like consistency.

It is a further object of the present invention to provide for a novel succession of steps of low temperature heating and confined molding of raw clay aggregate materials in the formation of greatly improved vitreous clay products which substantially reduces the degree of temperature, time, particle size and feed controls required to produce such a product, and in general to overcome a number of drawbacks and disadvantages of known processes.

It is an additional object to make provision for a novel confined compression molding step in the formation of vitreous clay products which is conformable for use in producing a wide variety of molded shapes, is relatively inexpensive to operate, easy to control and rapid in operation, and which avoids the necessity of subsequent corrective measures to place the final product in condition for commercial acceptance.

In accordance with the present invention, it has been discovered that a number of the above major probelms and others can be overcome in a greatly simplified way. Essentially, by incorporating at least minimal amounts of gaseous or gas-forming ingredients in the raw clay material, which may be either naturally present in the ingredients or artificially added, and confining the gases within the clay material throughout the molding operation while acting on the material through the application of a uniform pressure, the presence of such gases under confined conditions will act somewhat as a catalyst or fluxing agent to accomplish conversion of the raw clay material from a solid state to a fused state and into final vitrified form. The recognition of this fact is highly important for its utilization in clay firing and molding processes enables the preparation and heating of the clay in a minimum of time, the clay may be in its unconditioned state throughout and need only be rapidly heated to at least a temperature sufficient to cause bloating, this being at a temperature far below that necessary to convert the material into a fused state. Thus the time and temperature factors involved are greatly lessened and the associated problems of sticking of the clay to the processing equipment especially in the kiln or oven are removed. In the heated condition, the clay material may be removed into a mold and confined therein so as to prevent the escape of the gases or of the vapors contained within the material; then, upon the application of pressure to the material and while retaining the gases therein, it has been found that the combined action of a uniform pressure and the presence of gases operating under the influence of pressure will convert it rapidly into a fused state so that the material actually assumes a condition substantially the same as though it had been heated completely into the fusion range. However, the advantage in causing this conversion in the molding process is that it is being converted not only into a fused state but simultaneously being formed into the desired shape so as to result in one operation in the final vitreous product. Then, upon cooling or otherwise heat treating or annealing the final product in the mold the product may then easily be removed and is ready for use. Accordingly, the confined molding operation as described when performed on the hot unfused clay produces a fluid mass in the mold that flows readily into the desired molded shape and sets to form a glass-like or vitreous finished product having a uniform density, superior strength and an appearance that has heretofore been impossible to achieve under known processes, while avoiding the problem of sticking and greatly reducing the time and cost involved.

Additional advantages discovered in conjunction with the above described unique molding process is the fact that it may be performed in an unheated mold at a temperature several hundred degrees below that normally required to produce the fluid consistency necessary, and at relatively low pressures, although it is to be kept in mind that the pressure applied in the molding step of the present invention is a uniform pressure acting on all sides of and throughout the entire mass since the mass is in a completely confined, sealed state within the mold. Of added importance is the fact that this process eliminates trimming, polishing, cutting or other corrective operations which usually would follow the conventional compression molding step, and thus eliminates costly and difficult control measures previously considered necessary.

The above and other objects of the present invention will be made more apparent from the following detailed description taken together with the accompanying drawings, in which:

FIG. 1 is a schematic elevational view of a suitable processing plant which may be employed for carrying out the process of the present invention;

FIG. 2 is a detailed, schematic plan view of the molding apparatus of the plant; and FIG. 3 is a detailed schematic elevation view of the molding apparatus shown in FIG. 2.

Referring more particularly to a preferred manner of carrying out the process of the present invention, there is shown by way of illustration and not limitation in the drawings a typical processing unit or plant 10 in which raw clay aggregate materials may be fed either in their unconditioned form, or after suitable preparation into uniform particle size, through a conduit 12 leading into a hopper 13 which is inclined downwardly through a stack 14 for release of the materials into a rotary kiln 15 which is journaled for rotation on rollers 16 mounted on blocks 17. The rotary kiln may be generally of the type designed for testing clays for bloating and in the production of light-weight aggregate for concrete product manufacture and wherein a main burner unit 18 extends horizontally into the central opening at the discharge end of the rotary kiln and an auxiliary burner unit 20 similarly extends horizontally into the kiln in spaced relation beneath the burner 18. Each of the burners may suitably employ a natural gas, for example, and the small auxiliary burner 20 is added in the present invention to prevent the clay material from cooling in the discharge zone as it is being removed from the rotary kiln for collection in a mold 22. Additionally, a hood or jacket 23 is positioned over the discharge zone to enclose both the end of the rotary kiln and the mold box therein.

In the above relation, it is to be noted that the auxiliary burner projects through the hood or jacket and beyond the mold box only to maintain the clay in a heated condition as it is being discharged and not in any way to heat the mold box 22 as is commonly done. In addition, the process of the present invention has been found to operate much more effectively if the mold box 22 is maintained relatively cool in relation to the temperature of the material so as to prevent the material during the molding operation from sticking. To this end, the mold may be cooled by circulating air through suitable means into direct contact with the mold box without contacting the hot clay being discharged so as to prevent rapid cooling thereof. Also, since the mold box, being preferably formed of metal, has a definite rate of heat transfer it effects a predictable rate of cooling to the clay once contained therein, rather than by direct contact of the clay with the air which has no definite rate of heat transfer.

The mold 22, as best seen from FIGURES 2 and 3, may be of generally elongate rectangular form having one removable end 25 mounted between a pair of spaced tracks 26 and with its opposite end 27 having a movable ram 28 actuated by a power rod 29 for movement through the length of the mold in the molding operation. The mold box is partially enclosed along its top surface by a plate 30 extending from the removable end of the mold to an intermediate point along the mold at which point the terminal edge of the plate is provided with a cutting edge 31 for a purpose to be described. The remainder of the mold beyond the top plate 30 is left open at the top to form a receiving area 32 for reception of the hot clay as it is being discharged from the rotary kiln.

The removable end 25 of the mold is temporarily restrained from displacement by the use of shear pins 34 projecting from lugs 35 into engagement with the track until a predetermined pressure has been developed in the mold overcoming the resistance of the pins 34. Thus, as the desired amount of material is deposited into the receiving area 32 the power rod 29 may be either manually or otherwise operated to move the ram and material to the left toward the enclosed end of the mold. The ram 28 is dimensioned to move in sealed relation through the end enclosed by the top surface 30 so that as the ram passes the cutting edge 31 the clay material will become completely confined within that end and the gases will be trapped therein. As the ram continues to move through the enclosed end to compress the material the reaction to the movement of the ram will be that of a uniform pressure acting from all sides of the mold against the material and this, combined with the effect of the contained gases will cause a rapid conversion of the hot material from a solid to a fluid fused state. Once this occurs the shear pins as stated may be designed to release the movable end at a predetermined pressure level so that the compressed final product will be discharged from that end. The movable end may then be replaced by another end plate for the next molding operation.

The clay material is preferably discharged from the rotary kiln through a quiescent atmosphere in the jacket, into a relatively cool mold which is maintained substantially at room temperature through the circulation of the air in direct contact therewith. However, as the material is discharged it is in a solid state and it is only upon compression of the material in the enclosed end of the mold and in a confined area with the gases retained therein that the material is converted into a fluid state. Accordingly, the argillaceous materials employed in the process are generally of the type comprising the clay aggregates which either in their natural state contain at least minimum quantities of gas or gas-forming substances, or which, prior to introduction into the kiln have minor amounts of some gaseous substance added thereto. Clays which have been found suitable in this process are generally classed as brick clays of a relatively poor grade including gases, or gas-forming substances, such as $CO_2$, $SO_3$ and organic matter present therein. In this connection, any of the commonly known brick clays may be used, even in the absence of gases or gas-forming substances, by adding gas-containing materials such as Pyrites (iron sulphide) or $SO_3$, Siderite (iron carbonate) or $CO_2$, organic matter, lignite, or petroleum products. Moreover, high quality brick clay (having almost no gases present) may be used by adding the foregoing materials or for example by the incorporation therein of a black top soil containing organic matter and other gas-containing impurities, and, for example, it is possible to add as much as 25% black top soild. Accordingly, it will be seen that a relatively inexpensive clay material may be employed in carrying out the process of this invention and in fact the lower grade materials usually have higher quantities of gas-containing substances therein which are relatively important in carrying out this process. Broadly, the ease of conversion of the clay materials from a solid to a fluid mass is proportional to some extent to the amount of gases present in the heat-softened clay, and accordingly the heat applied may be varied inversely to the percentage gas content of the material.

Illustrative clays which have been found suitable are as follows:

TABLE I

|  | No. 1 | No. 2 | No. 3 | No. 4 | No. 5 |
|---|---|---|---|---|---|
|  | (Parts by Weight) | | | | |
| $SiO_2$ | 59.47 | 57.92 | 55.10 | 59.34 | 67.00 |
| $Al_2O_3$ | 19.64 | 14.40 | 23.80 | 15.71 | 17.61 |
| $Fe_2O_3$ | 4.77 | 3.60 | 3.51 | 5.76 | 3.67 |
| $CaO$ | 4.30 | 6.30 | 3.28 | 3.00 | 1.21 |
| $MgO$ | tr. | 1.08 | 1.24 | 2.09 | 1.32 |
| $Na_2O$ | 0.24 | 1.50 | 0.81 | 1.44 | 1.57 |
| $K_2O$ | tr. | 1.20 | 0.50 | 0.56 | 0.08 |
| $TiO_2$ | 1.14 | 1.22 | 1.05 | 1.83 | 2.10 |
| $H_2O$ | 5.70 | 4.85 | 6.00 | 7.02 | 5.20 |
| $CO_2$ | 3.25 | 6.50 | 1.75 | 1.07 | tr. |
| $SO_3$ | 0.90 | 1.44 | 3.37 | 0.31 | 0.53 |
| Organic | 0.55 | 1.34 | tr. | 2.00 | 1.03 |

Considering specifically the effect of the novel process on materials as set forth above, it may first be desirable to reduce the material to a substantially uniform particle size either by crushing, grinding or some similar well known method. In the present process such reduction is desirable only for the purpose of increasing the ratio of surface area-to-mass so as to enable the heat to penetrate to the interior of the particles more rapidly and reduce the heating time. Also, large lumps of the raw clay would be more difficult to handle in the later stages of the process, particularly in the molding stage. Nevertheless, and to further reduce the number of control steps in the process, this preliminary preparation of the material is not necessary but instead the material may be taken directly from the pits and sent through the hopper into the kiln in its unconditioned state, although it will be evident that elimination of these steps will make it more difficult for the material to reach a uniform temperature in the rotary kiln.

In the kiln, the raw material is heated to a point above that at which it reaches a bloated, heat softened, dry condition, but is substantially below the temperature required to initiate conversion of the clay into a fused or liquid state. For example, with materials as hereinbefore described, this temperature may range between 1800 degrees and 2250 degrees F. and in general will be at least 90% of that temperature required to heat the clay to the point of fusion. As a general guide depending upon the ingredients of the clay employed, the highest limit of temperature will be that at which the clay will initially become wet and sticky indicating at least some partial fusion of the material; the lower limit in temperature will be at least that at which the gases trapped in the material will be effective to cause expansion or bloating of the clay material.

It is emphasized that in the heating steps no attempt is made to form the raw material into a state of relatively uniform density but only to heat rapidly enough to cause bloating due to the partial or complete release of the gases below the temperature of fusion. In this connection, in accordance with conventional practice, bloating is brought about by heating the clay relatively fast so that most of the gases (mainly $CO_2$ and $SO_2$) become trapped in the material for expansion thereof at elevated temperatures. Stated another way, bloating may be defined as rapidly heating the clay so that it becomes soft enough (but not fused) that the gases released are trapped and expand the clay into a bubbly mass. Time limits for this will vary considerably due to different characteristics of the materials which may be employed. As a broad comparison, though, rapid heating would involve passing the clay through the kiln in approximately 1 to 3 hours, whereas ordinarily conventional brick products are fired for several days or more in the kiln. In the practice of the present invention it is actually preferred to heat the clay above the point of visible bloating, and specifically at least 100 degrees F. above that point so that substantially the entire mass is in a soft, dry bloated condition.

From the kiln, the hot, dry mass of material is preferably constantly fed through the discharge zone for depositing in the mold, and here, the auxiliary burner helps to maintain a relatively uniform temperature of the clay up to the time it is deposited in the mold. When the receiving area of the mold has become filled, the ram may then be actuated to force the material toward the enclosed end and to compress it under a uniform pressure while preventing any escape of the gases therefrom. It is at this point that the gases are believed to catalyze or act somewhat as a flux to cause conversion of the solid material into a final, completely fluid mass. Through the use of a cool mold box as described, it has been found that sticking in the mold as the material assumes a fluid state is almost completely eliminated since the conversion is very rapid from a solid to liquid state and then to the final vitreous, glass-like product. At the desired pressure level, continued forcing of the ram will cause shearing of the pins at the movable end of the mold for release of the final product. At this point, suitable annealing or heat treating operations may be employed to further enhance the qualities of the product.

In the following, a number of examples are set forth illustrating the process of the present invention, using relatively low grade brick clay materials set forth in the foregoing table.

*Example 1*

Clay No. 1 prior to heating was crushed to a pea-gravel size maximum and a coarse building-sand size minimum. The gas content of this clay by volume was approximately 40%. It was then fed through the hopper into the rotary kiln at a constant rate. The gas fire of the main burner was adjusted to provide a temperature of approximately 2175 degrees F. about 6 feet from the discharge lip of the rotary kiln. The small auxiliary burner was adjusted to keep the clay from cooling below 2000 degrees F. in the zone of 6 feet to the discharge lip, so as to use the lip area as a storage zone. In practice, actually the top heat zone temperature varied from about 2050 degrees F. to 2180 degrees F. so as to prevent the clay from reaching a temperature over 2185 degrees F. where this particular clay, it was found, starts to become wet and sticky or fused. Under rapid heating, the clay was found to be bloated and fairly soft but not in any way wet and sticky or fused. Under rapid heating, the clay into the mold box and the power rod operated to force the ram to compact and compress the clay against the enclosed end of the mold. Excess clay was cut off by the ram moving across the cutting edge, and this excess clay was returned into the rotary kiln. The compression force of the ram against the clay was continuous, in one action, without any interruption and the maximum pressure (across the ram face area) was approximately 50 lbs. per square inch at which level the pins retaining the end of the box were sheared to permit removal of the final product. This product was shaped in the mold and was removed as a vitreous, glass-like product, completely shaped and solid. It was placed in an annealing oven to remove the stressses, at a temperature of about 1500 degrees F.

In the molding operation, compression of the material took place in about 10 seconds from the time of deposition of the material into the mold and this was found to be sufficient to mold the hot clay in the cool mold box without cooling the clay material too much. No evidence of sticking of the clay material to the interior surfaces of the mold was observed upon completion of the operations.

*Example 2*

Using clay No. 2, having a gas content of approximately 60%, the same procedure and results took place as in Example No. 1 except that the temperature range at the top heat zone was approximately 1980 degrees F. minimum and 2090 degrees F. maximum as this clay possessed a higher flux than clay No. 1. At the discharge, the minimum temperature was held at approximately 1900 degrees F.

*Example 3*

Clay No. 3, having a gas content of approximately 40%, was heated and molded under essentially the same conditions as in Examples 1 and 2 and with the same results, again with the exception of the temperature range which had a top heat zone at approximately 2000 degrees F. minimum and 2100 degrees F. maximum and with the discharge zone minimum at about 1950 degrees F.

*Example 4*

Clay No. 4, with a gas content of about 25%, was heated employing the same procedure at a maximum of 2150 degrees F. and a minimum of 2050 degrees F. with the minimum temperature at the discharge zone being 2000 degrees F. The same results as in the preceeding examples were obtained.

*Example 5*

Clay No. 5, with a gas content of about 20% was heated to a maximum of 2200 degrees F. and a minimum of 2100 degrees F. at the top heat zone; the minimum temperature at the discharge zone was 2000 degrees F. Again, no evidence of stickiness or even partial fusion. Upon molding, the material was found to be completely vitreous.

At the temperatures expressed in the foregoing examples none of the clays were found to become in any way sticky and wet, except when pressure molded under completely confined pressure while retaining the gases therein. Then under this condition the material became very fluid and cohesive. Under repeated testing the more gases contained in the material the more easily it was to mold the materials and thus permit a lowering of the temperature in the heating process; and as a general relationship, it can be said that the ease of molding is somewhat proportional to the amount of gases contained therein, all other factors being equal. For the purpose of comparison, samples of hot clay heated in accordance with Example 1 were removed from the discharge zone and struck with a hammer while resting on a piece of asbestos paper and the sample pieces, due to the absence of any fused materials therein, did not form into a compressed mass. Obviously, under the impact of the hamber the gases were allowed to escape and the material itself simply broke up. Thus for a corresponding temperature it would be expected that conventional compression molding steps applied to a hot unfused mass would have little or no effect; however, by the retention of the gases therein while applying a uniform pressure to the material an unexpected conversion takes place to form the solid material into a completely vitreous product.

For commercial purposes, the process of the present invention is particularly well suited in the formation of bloated clay products where it is highly desirable to reduce the weight or density of the final product. In many cases, it is desirable to save as much as 40% of the weight per cu. ft. of the finished product by use of a corresponding volume of gas therein, either for building, structural or load-bearing materials. Moreover, by forming bloated clay products in accordance with the present invention and through conversion of the material into a vitreous state under uniform pressure it has been found possible to uniformly disburse the gas bubbles throughout the mass so as to have minimum effect on the overall strength and density of the product.

In commercial practice, close control of the temperature and other desired conditions in the process may be made possible through the use of equipment other than the representative kiln unit illustrated in the drawing. In fact a single rotary kiln is difficult to control and may often overheat the material. For example, a combined rotary kiln and moving hearth kiln, conventionally used in producing expanded or bloated clay aggregate, may be employed since closer control may be imposed.

Actually, as little as 0.5% by volume of gas to the overall mass can be present in the material in carrying out the process of the present invention, and the upper limit is only determined by the amount that each clay is able to contain in the form of bubbles. Of course, if more gas is present than the clay itself can contain, this extra gas will escape in the kiln upon heating. Moreover, in practical application, the upper limit of the percentage volume of gas would be determined by the required final density of the product.

Of course, the main commercial advantage of this process, aside from savings in fuel, is that it is not necessary to work with or handle a sticky material in the kiln. In the present process when the material becomes sticky it is in a relatively cool mold where it will not stick and accordingly may be easily ejected, which enables a considerable reduction in the cost of manufacturing equipment.

The pressure necessary in the mold operation will vary considerably with each clay and may in fact range between a pressure as low as at least 10 lbs. per sq. inch to an upper maximum of probably about 1000 lbs. per sq. inch. In commercial practice pressures between 20 lbs. per sq. inch and 500 lbs. per sq. inch would be entirely workable to produce the desired results. Moreover, the process of the present invention has been found operative with most all types of clay and argillaceous materials including the sandy clays which, although very brittle, may still be converted in the molding operation. Again, for some clays it is necessary to add organic matter and gas producing materials.

It will be apparent from the foregoing that, other than as expressed, it is almost impossible to set definite limits of temperature, pressure, and time within which the method may be carried out satisfactorily and outside which it fails. The reason is that there is at no point in a scale of gradually changing temperatures, pressures, and times, an abrupt change in the character of the product produced by the method, except at the temperature limit of fusion for the materials. In addition, the most favorable conditions of temperature, pressure, and time depend to a large degree upon the nature and state of the clay aggregate being treated, and sometimes the character of the final product. Thus, bloating takes place over a wide temperature beginning with isolated bloating and increasing to the extent of being noticeable throughout. It is the upper point of visible bloating and above which dictates what may be defined as the lower operating temperature of the process.

In accordance with the above several useful and novel features of the present invention, it is to be understood that various modifications and variations may be made in the process and materials employed therein without departing from the scope of the present invention, as defined by the appended claims and equivalents thereof.

What is claimed is:

1. The process for forming a vitreous product from a gas-containing argillaceous material comprising the steps of heating the raw material to a bloated condition below the temperature of fusion, discharging the heated material into a mold, the mold being at a temperature below the temperature of fusion of the material, and applying a uniform pressure to the material in the mold while confining the gases therein until the material is converted throughout into a fused condition.

2. The process according to claim 1 wherein the mold is maintained at a low temperature relative to the temperature of the heated material.

3. The process according to claim 1 in which the argillaceous material is in its unconditioned state.

4. The process for forming a vitreous clay product from an argillaceous material, the argillaceous material being characterized by containing at least 0.5% gas by volume therein, the process comprising the steps of heating the material to a heat softened, dry state below the temperature of complete fusion, removing the heated raw material into a mold, the mold being at a temperature below the temperature of fusion of the material, and confining the raw material to retain the gas therein while applying a uniform pressure until the material is converted throughout into a fused condition.

5. The process according to claim 4 in which the argillaceous material is first formed into particles of substantially uniform size prior to heating.

6. The process according to claim 4 in which the temperature at which the material is heated is varied inversely to the percentage gas content therein between an upper limit dictated by the temperature of complete fusion and a lower limit dictated by the temperature effective to cause visible bloating of the material.

7. The process for forming a bloated clay product from a clay material containing at least 0.5% gas therein, the process comprising the steps of heating the material to a heat softened dry state and below the heat required to fuse the material, the mold being at a temperature below the temperature of fusion of the material, removing the heated material into a mold, and applying pressure to the material in the mold while confining the gases therein until the material is converted throughout into a fused condition.

8. The process according to claim 7 in which the pressure applied is between 10 and 50 pounds per square inch.

9. The process according to claim 7 in which the material, following fusion, is annealed to remove the stresses therefrom.

10. The process for forming a bloated clay product from a brick clay material containing gaseous matter therein, the process comprising the steps of heating the material to a bloated dry state, discharging the heated material into a mold, the mold being at a temperature below the temperature of fusion of the material, applying a continuous uniform pressure to the material while confining the gases therein until the material is converted throughout into a fused vitreous condition, and thereafter annealing the resultant vitreous product to remove the stresses therefrom.

11. The process according to claim 10 in which the clay material is, prior to heating, formed into particles of uniform size.

12. The process according to claim 11 in which the pressure applied is at least 10 pounds per square inch.

References Cited in the file of this patent

UNITED STATES PATENTS

| | | |
|---|---|---|
| 1,809,215 | Pine et al. | June 9, 1931 |
| 1,818,101 | Slidell | Aug. 11, 1931 |
| 1,824,684 | Pine | Sept. 22, 1931 |
| 1,892,583 | Pine | Dec. 27, 1932 |
| 2,533,899 | Ryner | Dec. 12, 1950 |